(12) United States Patent
Chang

(10) Patent No.: US 9,106,734 B2
(45) Date of Patent: *Aug. 11, 2015

(54) COMPUTER SYSTEM AND PROCESSOR HAVING INTEGRATED PHONE FUNCTIONALITY

(75) Inventor: Chi Chang, Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 113 days.

This patent is subject to a terminal disclaimer.

(21) Appl. No.: 13/584,527

(22) Filed: Aug. 13, 2012

(65) Prior Publication Data

US 2012/0307988 A1 Dec. 6, 2012

Related U.S. Application Data

(63) Continuation of application No. 11/756,797, filed on Jun. 1, 2007, now Pat. No. 8,295,455.

(60) Provisional application No. 60/823,090, filed on Aug. 21, 2006.

(51) Int. Cl.
| H04M 11/00 | (2006.01) |
| H04M 1/247 | (2006.01) |
| G06F 3/02 | (2006.01) |
| G06F 3/023 | (2006.01) |
| G06F 3/0489 | (2013.01) |

(52) U.S. Cl.
CPC ............ *H04M 1/2473* (2013.01); *G06F 3/021* (2013.01); *G06F 3/023* (2013.01); *G06F 3/0489* (2013.01)

(58) Field of Classification Search
USPC ............... 379/93.05, 100.15, 100.16, 221.15, 379/419, 428.03, 428.04, 90.01
See application file for complete search history.

(56) References Cited

U.S. PATENT DOCUMENTS

| 6,285,890 B1 * | 9/2001 | Panian .......................... 455/557 |
| 7,268,747 B2 * | 9/2007 | Taniguchi et al. ................. 345/6 |
| 2004/0067750 A1 | 4/2004 | Engstrom et al. |

FOREIGN PATENT DOCUMENTS

| CN | 2615978 Y | 5/2004 |
| CN | 1550951 A | 7/2008 |
| TW | I241823 | 10/2005 |
| TW | 200540683 | 12/2005 |
| TW | I258103 | 7/2006 |
| WO | WO 2005/026918 | * 3/2005 |
| WO | WO2005026918 | * 3/2005 |

* cited by examiner

*Primary Examiner* — Yosef K Laekemariam
(74) *Attorney, Agent, or Firm* — Richard K. Huffman; James W. Huffman

(57) ABSTRACT

A computer system including telephone functionality. The computer system includes a first keyboard and a first display. The computer system also includes a processor having at least a first functional unit and a second functional unit, and further includes a phone portion. The computer system may operate in a first mode, a second mode, or a third mode. In the first mode, only the phone portion is activated, and the phone portion provides a functionality of placing and receiving phone calls without being removed from the computer system. In the second mode, the phone portion and first functional unit of the processor are activated. In the third mode, each of the phone portion, the first functional unit, and the second functional unit are activated.

16 Claims, 4 Drawing Sheets

COMPUTER SYSTEM AND PROCESSOR HAVING INTEGRATED PHONE FUNCTIONALITY

CONTINUATION AND PRIORITY DATA

This application is a continuation of U.S. nonprovisional application Ser. No. 11/756,797, filed on Jun. 1, 2007, which claims priority benefit of U.S. provisional application Ser. No. 60/823,090 titled "PC-Phone" filed Aug. 21, 2006, whose inventor was Chi Chang.

FIELD OF THE INVENTION

This invention relates to computer systems, and more particularly, computer systems with integrated phone functionality.

DESCRIPTION OF THE RELATED ART

In recent years, personal computers have been the focal point in a convergence of several different technologies into a single unit. In addition to providing its traditional functionality, personal computers may also incorporate radio, television, audio production, video production, media (i.e. CD or DVD) production and replication, among other types of functionality. Furthermore, computer systems that can incorporate telephone functionality are also available nowadays.

The incorporation of telephone functionality into computer systems can have several different uses. For example, workers at a call center for various institutions may utilize the incorporated telephone functionality to speak to callers while performing additional functions on the personal computer. In another use, players of online games may utilize the incorporated telephone functionality to verbally communicate with one or more additional players during the playing of the game. Furthermore, the telephone functionality may also be used in a manner similar to that of a stand-alone telephone.

Incorporating additional functionality such as that of a telephone into a computer system places additional demands on the design, manufacture, and operation thereof. In the design phase, allowance must be made for the extra circuitry that must be included, which may require additional chips. In the manufacturing phase, allowance must be made for assembly with any extra parts that might be required. And during the operational phase, allowance must be made for factors such as extra power consumption.

SUMMARY OF THE INVENTION

A computer system including telephone functionality is disclosed. In one embodiment, the computer system includes a first keyboard and a first display. The computer system also includes a processor having at least a first functional unit and a second functional unit, and further includes a phone portion. The computer system may operate in a first mode, a second mode, or a third mode. In the first mode, only the phone portion is activated and the phone portion provides a functionality of placing and receiving phone calls without being removed from the computer system. In the second mode, the phone portion and first functional unit of the processor are activated. In the third mode, each of the phone portion, the first functional unit, and the second functional unit are activated. Furthermore, the computer system may be configured such that during operations the first mode, the first and second functional units are de-activated, and during operations in the second mode, the second functional unit is deactivated.

In one embodiment, the first display is a computer display (e.g., a monitor or flat-panel display), while the first keyboard is a computer keyboard (e.g., a standard QWERTY keyboard). Some embodiments may include a second display that is a dedicated phone display. Embodiments including a second keyboard that is a keypad dedicated to phone operations are also possible and contemplated.

Various levels of operating system functionality may be utilized in the different modes. In the third mode, a full-featured operating system (e.g., Microsoft Windows™) may be operational. The third mode may encompass utilizing all the features of the second and first modes as well. Thus, operation in the third mode may enable functionality combining the computer system functionality, full graphics modes (e.g., 3D graphics), networking (e.g., e-mail), and telephony. In the third mode, the computer system may be useful in various environments, such as in a customer call center or for use in multi-player online games, where a full host of operating system features, network communications, and voice communications are all required concurrently.

In the second mode, the functionality of the operating system is reduced with respect to that of the third mode. In the second mode, some features may still be available, such as internet access through a wireless local area network (WLAN), e-mail, digital video broadcasts for handheld devices (DVB-H), and so forth, as well as those features associated with the phone mode. However, the full functionality of the operating system is not available in this mode, and thus functionality such as multi-player online gaming may be unavailable.

In the first mode, basic telephony features are available, along with some additional functionality, including .mp3 audio and assistant global positioning system (AGPS) functionality.

Because the different modes provide different levels of functionality, portions of the computer system associated with certain types of functionality may be powered on or off as necessary. Broadly speaking, the first (i.e. phone) mode may require less power than the second mode, which may in turn require less power than the third mode. Thus, portions of the system not required for operating in the phone mode may be powered down during phone mode operations. Similarly, portions of the system not required for operating in the second mode may be powered down during second mode operations. In the third mode, the entire system may be powered up. By matching the operational requirements of each mode to certain power requirements and powering down unused portions of the system, the functionality of each of the various modes may be utilized while conserving power.

BRIEF DESCRIPTION OF THE DRAWINGS

Other aspects of the invention will become apparent upon reading the following detailed description and upon reference to the accompanying drawings in which.

Figure 1:
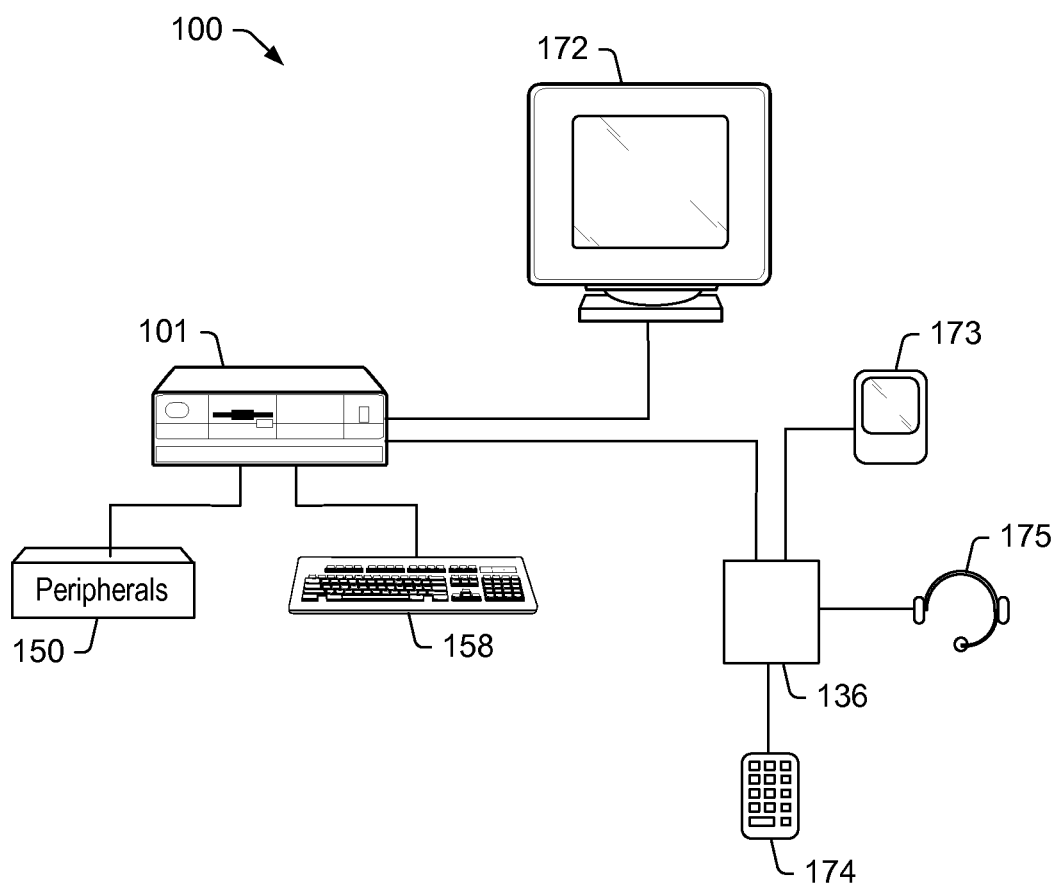
FIG. 1 is a drawing illustrating one embodiment of a computer system having integrated telephone functionality.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE EMBODIMENTS

Turning now to FIG. 1, an illustration of one embodiment of a computer system having integrated telephone functionality is shown. It should be noted that the embodiment shown in FIG. 1 is exemplary, with other embodiments being possible and contemplated.

In the embodiment shown, computer system 100 includes a processor 101, a first display 172, and a first keyboard 158. Processor 101 may be a desktop unit, a tower unit, or any other unit suitable for incorporating the functionality of the computer system. Various system components may be contained within processor 101, such as a motherboard having a central processing unit (CPU), various chipset components, memory components, buses, and various host controllers, among other components. Processor 101 may also include various types of interfaces, such as USB (universal serial bus) ports, and so forth.

First display 172 in this embodiment is a flat panel display. In other embodiments, first display 172 may be a CRT monitor or any other suitable type of display. In embodiments wherein it is the only display unit present, first display 172 will provided all display functions for each mode of operation of the system.

First keyboard 158 includes a standard QWERTY keyboard typically included with a personal computer system. First keyboard 158 may also include a numeric keypad and other keys for invoking or controlling certain types of functionality of the computer system. In embodiments wherein it is the only keyboard unit present, first keyboard 158 is used for providing user input for each of the modes of operation.

Although not explicitly shown, a mouse or other input device (e.g., a trak-ball) may also be coupled to processor 101.

In the embodiment shown, computer system 100 also includes baseband unit 136, which may provide various functionality related to a first mode of operation of the computer system (hereinafter the 'phone' mode). Baseband unit 136 may be configured to output baseband voice signals from telephone communications, and is also configured for the input thereof through the microphone of headset 175 (other audio I/O devices, such as standalone microphones for input or a speaker for output, are also possible and contemplated). In some embodiments, baseband unit 136 may also be configured for playing .mp3 or other similar audio file types and outputting audio produced therefrom, as well as performing other functions that will be discussed in further detail below.

In the embodiment shown, computer system 100 includes a second keyboard 174, and a second display 173. Second keyboard 174 may comprise a numeric keypad and any additional keys that may be necessary or useful for telephony purposes or any other functions provided by baseband unit.

Second display 173 may be a smaller display than first display 172. In the phone mode, second display 173 may be used to display output information provided by baseband unit 136, such as a phone number connected to or information regarding an .mp3 audio file that is being played.

Second keyboard 174 and second display 173 are not included in all embodiments of computer system 100. In embodiments in which second keyboard 174 and second display 173 are not included, first keyboard 158 and first display 172 are used to provide the keyboard and display functions, respectively, for operations in the phone mode. Otherwise, embodiments that do include the second keyboard 174 and second display 173 may utilize them during the phone mode, and depending on the particular embodiment, may also utilize them in the second mode (hereinafter '2D mode') and third mode (hereinafter '3D mode').

Computer system 100 may also include one or more peripherals 150. Such peripherals may include printers, external storage drives, scanners, joysticks, or any other peripheral device that may be used with a computer system.

Figure 2:
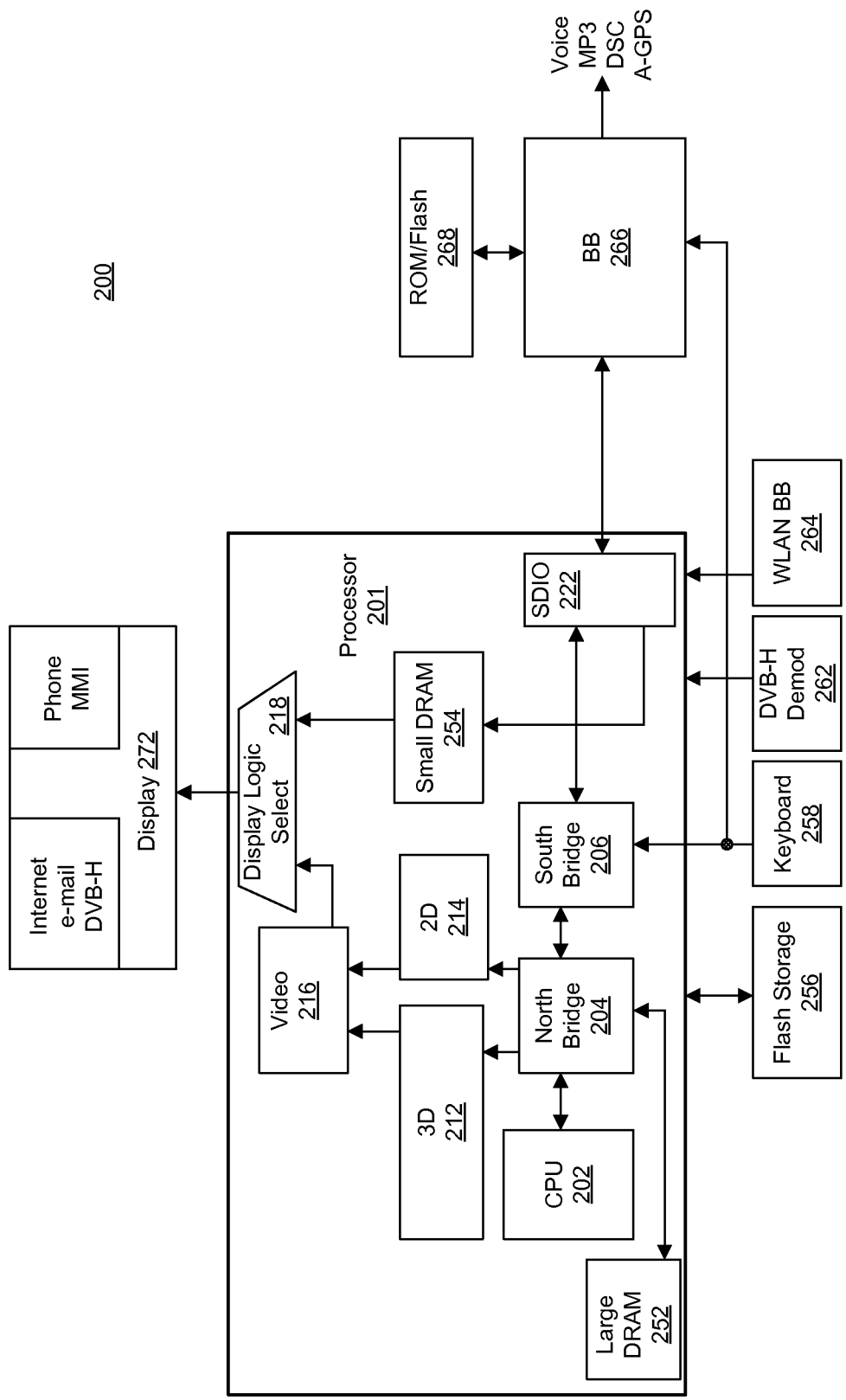
FIG. 2 is a block diagram of one embodiment of a computer system with one keyboard and one display.

Turning now to FIG. 2, a block diagram of one embodiment of a computer system is shown. In the embodiment shown, computer system 200 is configured for operation in the phone mode, the 2D mode, and the 3D mode, and includes a single keyboard 258 and a single display 272.

In the embodiment shown, processor 201 of computer system 200 includes CPU (central processing unit) 202. CPU 202 may be one of many different types of processors, and may configured to execute instructions of a CISC (complex instruction set computing) instruction set and/or a RISC (reduced instruction set computing) instruction set. A RISC instruction set includes instructions that typically execute within one clock cycle. Alternatively, a CISC instruction set includes instructions that typically require multiple clock cycles to execute. In a RISC instruction set, LOAD and STORE are separate instructions, while these instructions are incorporated into other instructions in a CISC instruction set. In one embodiment of computer system 200, CPU 202 may be configured to execute instructions from the x86 instruction set, which includes CISC instructions and may also include some RISC instructions.

CPU 202 is coupled to a North Bridge 204, which is part of a chipset implemented in processor 201. North Bridge 204 may comprise a memory controller hub, and may coordinate communications between CPU 202, random access memory, and South Bridge 206. In the embodiment shown, North Bridge 204 is further configured to coordinate communications between CPU 202 and 3D unit 212, as well as between CPU 202 and 2D unit 214 (3D unit 212 and 2D unit 214 will be discussed in further detail below). North Bridge 204 is also configured to communicate with Large DRAM (dynamic random access memory) 252, which provides the main memory function for computer system 200.

South Bridge 206 is another chip of the chipset for process 201. More particularly, South Bridge 206 is configured to implement the functions of an I/O controller hub. In the embodiment shown, South Bridge 206 is coupled to receive inputs from keyboard 258 and is further configured to communicate with standard device I/O (SDIO) interface 222. South Bridge 206 may also be coupled to coordinate communications involving various buses (not shown for the sake of simplicity) such as a PCI (peripheral component interconnect) bus, an ISA (industry standard architecture) bus, ATA (advanced technology attachment) and SATA (serial ATA), and so forth. South Bridge 206 may also provide support for a USB host controller, an Ethernet connection, and other I/O connections. SDIO interface 222 is coupled to South Bridge 206, and provides an interface for certain devices that may be coupled to processor 201, such as certain types of multimedia cards.

As previously noted, North Bridge 204 is coupled to both 3D unit 212 and 2D unit 214. 3D unit 212 is a functional unit configured to provide functions that are associated with the 3D mode, including (but not limited to) 3D graphics. 2D unit 214 is a functional unit configured to provide functions that are associated with the 2D mode, including (but not limited to) a more limited graphics set than provided by 3D unit 212. Both 3D unit 212 and 2D unit 214 are coupled to provide inputs to video unit 216, which may be a graphics card, a graphics chip, or a set of graphics chips. The output of video unit 216 is coupled to display select logic 218, which in turn has an output coupled to display 272. Display select logic is configured to select the input coupled to video unit 216 during operation in either of the 2D or 3D modes. During operation in the phone mode, display select logic is configured to select the input coupled to small DRAM 254, which may receive data from baseband unit 266 via SDIO interface 222.

Display 272 may be any suitable type of display, such as a flat panel display (liquid crystal display, plasma, or other type) or a monitor (e.g., a cathode ray tube display). Some television displays may also be suitable for use with computer system 200. In the embodiment shown, display 272 is used to display information for each of the three modes of operation. During operation in the phone mode, display 272 is configured to display a phone man machine interface (MMI) that may provide information related to a phone call being made or related to other functions that may be performed in the phone mode. During operation in the 2D mode, display 272 may also display additional information, such as information related to internet access (e.g., a web browser), an email client, and information from a digital video broadcast for handheld devices (DVB-H), among other types of information. In the 3D mode, display 272 may also display information associated therewith, such as 3D graphics from a multi-player online game.

Computer system 200 may also include at least one flash storage device 256 and a DVB-H demodulator 262. The flash storage device 256 may be one of any many different types of portable flash drives that are commonly available, and may be coupled to processor 201 through any suitable port (e.g., through a USB port). DVB-H demodulator 262 may provide demodulation of signals associated with digital video broadcasts for handheld devices, converting the signals into a format suitable for processing in computer system 200.

WLAN (wireless local area network) baseband unit 264 may provide network connectivity for computer system 202. In one embodiment, WLAN baseband unit 264 may be a wireless router, and may be coupled to a network card within processor 201 (not shown here for the sake of simplicity). Embodiments of computer system 200 that utilize a wired network connection instead of a wireless network connection as well as those configured for both wired and wireless network communications are also possible and contemplated.

Baseband unit 266 is configured to provide various functionality related to operation in the phone mode. Such operation includes voice input and audio output, the placing and receiving of telephone calls, playing audio filed (e.g., .mp3 files) and outputting audio therefrom, and so forth. Baseband unit 266 is coupled to a memory unit 268 which may provide read-only memory (ROM) storage, flash memory storage, or other similar variations of memory storage. Memory unit 268 may provide storage for various data and instructions that may be necessary to operate in the phone mode. Data may include information such as a user phone book, call history, information regarding settings, and so forth. Instructions may include instructions that, when executed on a processor of baseband unit 266, cause the playing of audio files, processing incoming or outgoing information (e.g., packets) relating to phone calls being made, processing GPS information, and so forth. In one embodiment, the instructions may be RISC instructions, and thus may be executed by a RISC microprocessor embedded in baseband unit 266. The microprocessor used in baseband 266 may be one that is typically used in handheld devices, such as a PDA (personal digital assistant), cellular telephone, portable gaming device, or portable music player. In one embodiment, the microprocessor utilized in baseband unit 266 may incorporate the ARM (Advanced RISC Machine) architecture.

As previously noted, the embodiment of computer system 200 illustrated in FIG. 2 includes only a single display and a single keyboard. Thus, keyboard 258, in addition to being coupled to south bridge 206, is also coupled directly to baseband unit 266, and thus is used to provide any keyed user input required for its operation. For example, keyboard 258 may be used to input a number of a telephone to which a call is to be placed. With regard to the display of information related to phone mode operations, baseband unit is configured to communicate with display 272 via SDIO unit 222, small DRAM 254, and display logic select unit 218.

Since some modes of operation of computer system 200 may have different power requirements than the other modes, some units of computer system 200 may be powered down during certain modes of operation. Table 1 illustrates which units may be powered on and/or active during the various modes of operation, along with supported features for computer system 200 illustrated in FIG. 2.

TABLE 1

| Operational Mode | Features Available | Active Units |
| --- | --- | --- |
| Phone | Telephony, Audio/Voice, .mp3, GPS, A-GPS, etc. | BB 266, Rom/Flash 268, Keyboard 258, display 272, small DRAM 254, select 218, SDIO 222 |
| 2D | All phone mode features plus internet/email, DVB-H, imaging, DVD, some operating system features | All phone mode units plus NB 204, SB 206, 2D 214, DVB-H demod 262, WLAN BB 264, video 216, CPU 202, large DRAM 252, flash storage 256 |
| 3D | All phone and 2D mode features plus 3D gaming, online gaming, full operating system | All phone and 2D mode units plus 3D 212. |

Thus, in phone mode, only a few necessary units are powered on and/or active. By limiting which units are powered on and active during phone mode operation, power may be saved relative to other modes since those units which are not needed may be powered down. Similarly, operating in the 2D mode may save power relative to operating in the 3D mode, since 3D unit 212 need not be powered on during 2D operation. In the 3D modes, all units may be powered on, as this mode may allow utilization of the full functionality provided by computer system 200.

It should be noted that Table 1 is exemplary. In various embodiments, different sets of features may be provided in the various modes of operation. These different sets of features may include a greater or lesser number of features, and may also include features different than those explicitly shown in Table 1. Similarly, the units that are active for each of the modes of operation may also be different. Additional units not explicitly disclosed herein may also be involved in the operation in various modes, and may be powered on or off accordingly. Some of the units explicitly disclosed herein may not be present in all embodiments.

As noted in Table 1, different levels of a computer operating system may be utilized in the 2D and 3D modes. In the 3D mode, a fully functional operating system such as Microsoft Windows™ may be utilized. This may allow the utilization of such functionality as that which is necessary for 3D and online gaming and so on. In the 2D mode, some operating system functions may be available, including (but not limited to) internet access (through a LAN or WLAN), e-mail, digital video broadcasts, or the playing of DVD's on systems so configured. However, the full functionality of the operating system is not available in this mode, and thus functions such as 3D gaming and online gaming are correspondingly not available. Furthermore, 3D unit 212 is not active in the 2D mode, and thus power savings associated with powering down this unit may be realized.

In the phone mode, none of the operating system features are available, although the functionality of the phone mode is still fully available. Neither 3D unit 212 or 2D unit 214 are active in the phone mode, and thus power savings may be achieved by removing power from these units during this mode of operation. Furthermore, other units as noted in the table may also be powered down during operation in the phone mode, thereby realizing additional power savings over that of the 2D mode.

It should be noted that the various functional units shown within processor 201 may be implemented in any combination of integrated circuits. For example, in one embodiment, each functional unit within processor 201 may be implemented with integrated circuits that are separate with respect to those of other functional units. In another embodiment, some functional units may be combined into a single integrated circuit (e.g., an embodiment that combines CPU 202, 3D unit 212, and 2D unit 212 into a single integrated circuit is contemplated). Some units may also be implemented as a separate circuit card. For example, video unit 216 may be implemented as one or more graphics chips one a motherboard, or alternatively, may be implemented as a separate graphics card that includes the one or more graphics chips.

Figure 3:
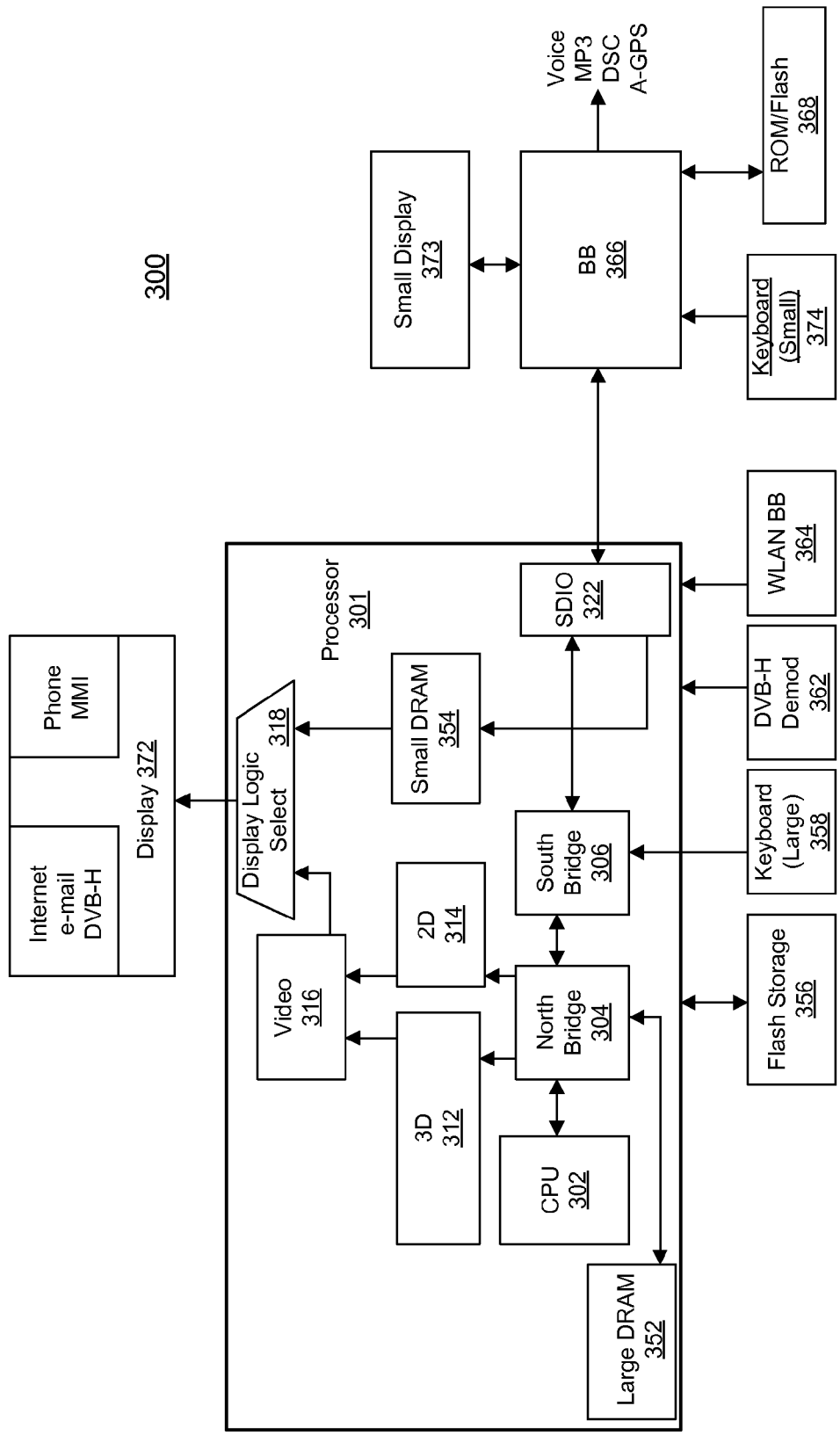
FIG. 3 is a block diagram of one embodiment of a computer system with two keyboards and two displays.

Turning now to FIG. 3, another embodiment of a computer system is shown. Various functional units shown in FIG. 3 may be equivalent or similar to their counterparts shown in FIG. 2. For example, CPU 302, 3D unit 312, 2D unit 314, and baseband unit 366 may each be equivalent or similar to their counterparts shown in FIG. 2—CPU 202, 3D unit 212, 2D unit 214, and baseband unit 266, respectively. Thus, where various functional units of FIG. 3 have a similar or equivalent counterpart in FIG. 2, the explanation of the counterparts above may also be applied to those units shown in FIG. 3.

In the embodiment shown in FIG. 3, computer system 300 includes two keyboards and two displays. More particularly, computer system 300 includes large keyboard 358 and small keyboard 374, and also includes large display 372 and small display 373. Since this particular embodiment includes two keyboards, large keyboard 358 is not coupled to baseband unit 366, in contrast to the embodiment of FIG. 2 where keyboard 258 is coupled to baseband unit 266. Table 2 illustrates which units may be powered on and/or active during the various modes of operation, along with supported features for computer system 200 illustrated in FIG. 3.

TABLE 2

| Operational Mode | Features Available | Active Units |
|---|---|---|
| Phone | Telephony, Audio/Voice, .mp3, GPS, A-GPS, etc. | BB 322, Rom/Flash 368, Small Keyboard 374, small display 373 |
| 2D | All phone mode features plus internet/email, DVB-H, imaging, DVD, some operating system | All phone mode units plus NB 304, SB 306, 2D 314, DVB-H demod 362, WLAN BB 364, video 316, CPU 302, large DRAM 352, flash storage 256 |
| 3D | All phone and 2D mode features plus 3D gaming, online gaming, full operating system | All phone and 2D mode units plus 3D 312. |

TABLE 2-continued

During phone mode operations, baseband unit 366 may utilize small display 373 in order to display information. This is in contrast to computer system 200, where display 272 is used to display information for each of the three operational modes. Accordingly, display 372 may be powered down during operation in the phone mode, which may provide additional power savings relative to embodiments where the larger system display is required during this mode. Similarly, due to the presence of small keyboard 374, large keyboard 358 may remain idle during phone mode operations, and any power consumption associated with its use may also be saved.

When operating in the 2D or 3D modes, the phone portion of the system may use display 372 to display information, or may alternatively use small display 373. If display 372 is used to display information from baseband unit 366 in the 2D and 3D modes, then small display 373 may be powered off to reduce power consumption. Similarly, if operating in the 2D or 3D modes, use of small keyboard may not be required, and thus it may be placed into an idle state or be powered down if it is a power consuming device. However, embodiments are also possible and contemplated wherein both small display 373 and small keyboard 374 remain active during operation in the 2D and 3D modes.

Figure 4:
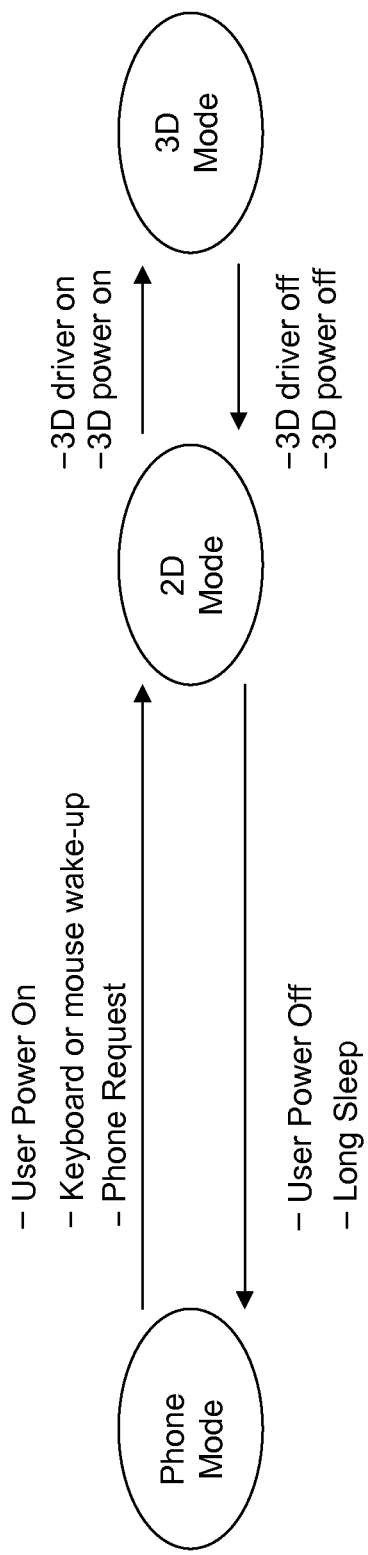
FIG. 4 is a diagram illustrating transitions between the various modes for one embodiment of the computer system.

Turning now to FIG. 4, a diagram illustrating transitions between the various modes for one embodiment of the computer system. More particularly, FIG. 4 illustrates switching between the phone mode and the 2D mode as well as switching between the 2D mode and the 3D mode.

When operating in the phone mode, a user can switch to the 2D mode by taking one of several actions. If the processor (e.g., processor 201 or 301 discussed above) is not already powered up, switching from the phone mode can be accomplished using a power switch. This action will apply power to those functional units within the processor (as well as other peripheral devices not associated with the phone mode), and may additionally provide power to peripheral units coupled to the processor. If, on the other hand, the processor is already powered up but in a low-power "sleep" mode, switching from the phone mode to the 2D mode may be accomplished by movement of a mouse attached to the processor or pressing a key on the large (i.e. QWERTY) keyboard coupled to the processor. Switching from the phone mode to the 2D mode may also take place based on a request from the baseband unit through the SDIO unit.

Switching from the 2D mode back to the phone mode may be accomplished by logging off and powering down the processor of the computer system. Furthermore, after a long period of inactivity, the processor and various peripherals of the computer system may enter a sleep mode, at which time switching from the 2D mode to the phone mode may take place.

Switching from the 2D mode to the 3D mode may be accomplished by invoking a driver for the 3D mode. For example, if a user of the computer system operating in the 2D mode attempts to start an online game having 3D graphics capabilities, the 3D driver may be invoked and thus cause the computer system to enter 3D mode. Alternatively, switching from the 2D mode to the 3D mode may occur by simply applying power to the 3D functional unit in the computer system.

Switching from the 3D mode to the 2D mode may be accomplished by turning off the 3D driver (e.g., by exiting the game or other software application that invoked it in the first place) or by removing power from the 3D functional unit.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

I claim:

1. A computer system including telephone functionality, the computer system comprising:
    a first display;
    a phone portion, wherein the phone portion is associated with at least a first mode of operation; and
    a processor, wherein the processor includes at least a 2D unit associated with at least a second mode of operation, and at least a 3D unit associated with a third mode of operation;
    wherein in the first mode the phone portion is activated;
    wherein, in the second mode, the phone portion and 2D unit are both activated;
    wherein, in the third mode, each of the phone portion, the 2D unit, and the 3D unit are activated; and
    wherein the computer system is configured to transition from the second mode to the third mode responsive to activating a driver for the third mode and applying power to the 3D unit, and wherein the computer system is further configured to transition from the third mode to the second mode responsive to deactivating the driver for the third mode or removing power from the 3D unit.

2. The computer system as recited in claim 1, wherein the computer system includes a first keyboard and a second keyboard, wherein the second keyboard is powered up and activated during operation in the first mode, and wherein the first keyboard is not activated during operation in the first mode.

3. The computer system as recited in claim 2, wherein the second keyboard is a phone keypad.

4. The computer system as recited in claim 2, wherein both the first and second keyboards are activated during the second and third modes.

5. The computer system as recited in claim 1, wherein the computer system includes a second display, and wherein, in the first mode, the second display is activated and the first display is not activated.

6. The computer system as recited in claim 1, wherein the computer system includes a second display, and wherein, during the second and third modes, the first display is activated and the second display is not activated.

7. The computer system as recited in claim 1, wherein the computer display is configured to display the phone man machine interface (MMI) that provides information related to the phone call being made during the second and third modes.

8. The computer system as recited in claim 5, wherein the second display is a dedicated phone display.

9. The computer system as recited in claim 1, wherein in the third mode, the computer system is configured to run a 3D function.

10. The computer system as recited in claim 9, wherein in the second mode, the computer system is configured to run a 2D function having less functionality than the 3D function.

11. The computer system as recited in claim 1, wherein the computer system is configured to transition from the first mode to the second mode responsive to a user request, and wherein the computer system is configured to transition from the second mode to the first mode after a predetermined time in a sleep state.

12. The computer system as recited in claim 1, wherein the 3D unit is not activated in either of the first or second modes.

13. A method for operating a computer system having phone functionality, the method comprising:
    operating the computer system in a first mode, wherein, in the first mode, a phone portion of the computer system is activated;
    operating the computer system in a second mode, wherein, in the second mode, the phone portion and a 2D unit of the computer system are activated;
    operating the computer system in a third mode, wherein, in the third mode, the phone portion, the 2D unit, and a 3D unit of the computer system are activated;
    transitioning form the second mode to the third mode responsive to activating a driver for the third mode and applying power to the 3D unit; and
    transitioning from the third mode to the second mode responsive to deactivating the driver for the third mode or removing power from the 3D unit.

14. The method as recited in claim 13 further comprising:
    running a 3D function in the third mode; and
    running a 2D function in the second mode, wherein the 2D function has less functionality than the 3D function.

15. The method as recited in claim 13 further comprising:
    transitioning from the first mode to the second mode responsive to a user request; and
    transitioning from the second mode to the first mode after a predetermined time in a sleep state.

16. The method as recited in claim 13, wherein:
    the 3D unit is not activated when operating the computer system in the second mode.

* * * * *